US009769096B2

(12) United States Patent
Xie et al.

(10) Patent No.: US 9,769,096 B2
(45) Date of Patent: Sep. 19, 2017

(54) METHOD, APPARATUS, SYSTEM AND COMPUTER READABLE STORAGE MEDIUM OF ADDING INSTANT MESSAGE CONTACT

(71) Applicant: TENCENT TECHNOLOGY (SHENZHEN) COMPANY LIMITED, Shenzhen (CN)

(72) Inventors: Xin Xie, Shenzhen (CN); Xiaoxiang Zuo, Shenzhen (CN); Shiqi Xu, Shenzhen (CN); Xianxian Zhang, Shenzhen (CN); Yecheng Xian, Shenzhen (CN); Xiaoyuan Gu, Shenzhen (CN); Junbiao Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 391 days.

(21) Appl. No.: 14/264,335

(22) Filed: Apr. 29, 2014

(65) Prior Publication Data
US 2014/0237034 A1    Aug. 21, 2014

Related U.S. Application Data

(63) Continuation of application No. PCT/CN2014/070250, filed on Jan. 7, 2014.

(30) Foreign Application Priority Data

Jan. 16, 2013    (CN) .......................... 2013 1 0016361

(51) Int. Cl.
*G06F 15/16* (2006.01)
*H04L 12/58* (2006.01)

(52) U.S. Cl.
CPC .................................. *H04L 51/046* (2013.01)

(58) Field of Classification Search
CPC ........ H04L 12/58; H04L 51/046; H04L 29/06
See application file for complete search history.

(56) References Cited

U.S. PATENT DOCUMENTS 8,504,586 B2 * 8/2013 Armstrong ........ G06F 17/30867
707/781
2001/0013050 A1 * 8/2001 Shah .................... G06Q 10/109
709/202

(Continued)

FOREIGN PATENT DOCUMENTS

| CN | 101431486 A | 5/2009 |
| CN | 101632316 A | 1/2010 |
| CN | 102185862 A | 9/2011 |

*Primary Examiner* — Benjamin M Thieu
(74) *Attorney, Agent, or Firm* — Fitzpatrick, Cella, Harper & Scinto

(57) ABSTRACT

There are provided a method, apparatus, system and computer readable storage medium of adding an instant message contact. The method includes: receiving a joining-in request for a group from a client where a user locates, the joining-in request comprising a group identifier; acquiring audio and/or video information of other user in the group, based on the group identifier; and transmitting the audio and/or video information of the other user to the client where the user locates, for adding by the client where the user locates the instant message contact based on the audio and/or video information of the other user. Thereby, the mutual trust between unknown users is improved, and the success ratio of adding an unknown user as a contact and the ratio of turning into a contact from an unknown user are increased.

17 Claims, 5 Drawing Sheets

(56) References Cited

U.S. PATENT DOCUMENTS

| | | | |
|---|---|---|---|
| 2007/0233291 A1* | 10/2007 | Herde | G06Q 10/02 |
| | | | 700/91 |
| 2008/0071875 A1* | 3/2008 | Koff | H04L 12/5825 |
| | | | 709/206 |
| 2008/0207242 A1 | 8/2008 | Ekberg | |
| 2009/0265429 A1* | 10/2009 | Gestsson | H04L 12/5835 |
| | | | 709/204 |
| 2011/0246908 A1* | 10/2011 | Akram | H04N 21/234318 |
| | | | 715/752 |
| 2011/0270921 A1* | 11/2011 | Jones | G06F 3/0421 |
| | | | 709/204 |
| 2011/0302247 A1* | 12/2011 | Narayanan | H04L 12/5855 |
| | | | 709/205 |
| 2012/0271883 A1* | 10/2012 | Montoya | H04W 4/023 |
| | | | 709/204 |
| 2013/0018960 A1* | 1/2013 | Knysz | H04L 65/403 |
| | | | 709/204 |
| 2013/0031208 A1* | 1/2013 | Linton | H04L 67/125 |
| | | | 709/217 |
| 2014/0195675 A1* | 7/2014 | Silver | H04L 65/1083 |
| | | | 709/224 |

\* cited by examiner

METHOD, APPARATUS, SYSTEM AND COMPUTER READABLE STORAGE MEDIUM OF ADDING INSTANT MESSAGE CONTACT

CROSS-REFERENCES TO RELATED APPLICATIONS

This application is a continuation of International Application No. PCT/CN2014/070250, filed on Jan. 7, 2014, which claims priority to Chinese patent application No. CN201310016361.0 named "METHOD, APPARATUS AND SYSTEM OF ADDING INSTANT MESSAGE CONTACT" and filed on Jan. 16, 2013, the content of which is incorporated herein by reference in their entirety.

TECHNICAL FIELD

The present disclosure relates to the field of instant messenger technology, and particularly to a method, apparatus, system and computer readable storage medium of adding an instant message contact.

BACKGROUND

With the increasingly development of IM (Instant Messenger) software, the requirement of adding contacts by IM users is increasing high. The contacts mainly include known contacts existing in the real life and unknown contacts meeting by the IM software.

In a method, a user of the IM software adds an unknown contact mainly by determining the unknown contact to be added through the entered username or other matching conditions, and then transmitting text invitation information to the unknown contact to be added.

The above manner of adding an unknown contact is not intuitional. Users can only add unknown contacts by virtue of limited text information. Thereby, the reality feeling of making friends through Internet is relatively weak, which is disadvantageous in adding contacts between strangers and makes the ratio of turning into contact relatively low.

SUMMARY OF THE DISCLOSURE

One embodiment of the present disclosures a method of adding an instant message contact, including: receiving a joining-in request for a group from a client where a user locates, the joining-in request comprising a group identifier, acquiring audio and/or video information of other user in the group, based on the group identifier; and transmitting the audio and/or video information of the other user to the client where the user locates, for adding by the client where the user locates the instant message contact based on the audio and/or video information of the other user.

Also, there is provided in an embodiment of the present disclosure an apparatus of adding an instant message contact, including: a group joining-in request reception module configured to receive a joining-in request for a group from a client where a user locates, the joining-in request comprising a group identifier; a first user information acquisition module configured to acquire audio and/or video information of other user in the group, based on the group identifier; and a first user information transmission module configured to transmit the audio and/or video information of the other user to the client where the user locates, for adding by the client where the user locates the instant message contact based on the audio and/or video information of the other user.

Also, there is provided in an embodiment of the present disclosure a system of adding an instant message contact, including a server and a first client, wherein the server is configured to receive a joining-in request for a group from the first client where a user locates, the joining-in request comprising a group identifier, to acquire audio and/or video information of other user in the group based on the group identifier, and to transmit the audio and/or video information of the other user to the first client where the user locates; the first client is configured to receive the audio and/or video information of the other user transmitted from the server, for adding by the first client where the user locates the instant message contact based on the audio and/or video information of the other user.

Also, a computer readable storage medium is provided in an embodiment of the present disclosure, the storage medium having stored thereon a computer program containing program codes, which, when executed on a computing device, perform respective steps of the method of adding an instant message contact as described above.

In the embodiments of the present disclosure, the audio and/or video information of the other user in the group requested by the user is transmitted to the user according to the user's request so that the user may determine whether to add the other user as the instant message contact or not based on the audio and/or video information of the other user. It realizes that the user may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

BRIEF DESCRIPTION OF THE DRAWINGS

In order to explain technical schemes in embodiments of the present disclosure more clearly, simple introduction of attached drawings needed to be used in the description of embodiments will be given below. Apparently, the attached drawings in the description below are only some embodiments of the present disclosure. For those ordinary skilled in the art, other attached drawings can be obtained according to these attached drawings without inventive efforts.

DETAILED DESCRIPTION

In order to make the object, technical schemes and advantages of the present disclosure more clear, a further detailed description of implementations of the present disclosure will be made in conjunction with attached drawings below.

First Embodiment

Figure 1:
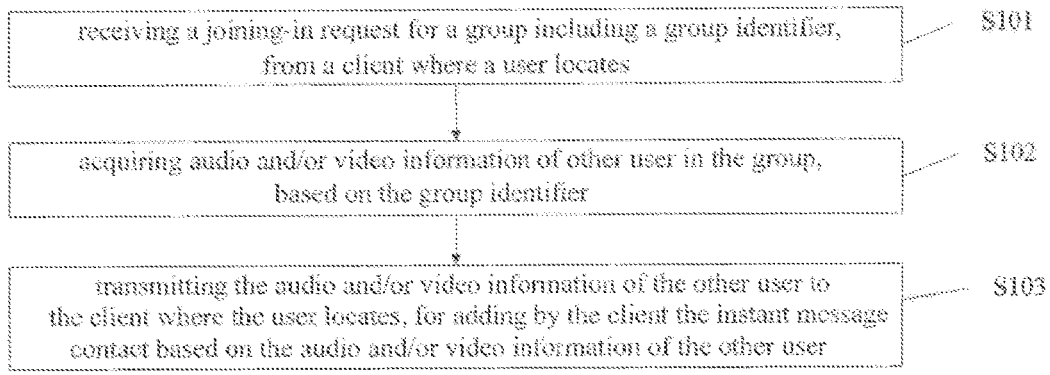
FIG. 1 is a flowchart of a method of adding an instant message contact provided in a first embodiment of the present disclosure.

A method of adding an instant message contact is provided in the embodiment of the present disclosure. Referring to FIG. 1, the method includes the following steps.

At Step S101, a joining-in request for a group is received from a client where a user locates, the joining-in request including a group identifier. The client may be hardware such as a mobile phone, a computer or the like.

At Step S102, audio and/or video information of other user in the group is acquired, based on the group identifier.

At Step S103, the audio and/or video information of the other user is transmitted to the client where the user locates, so that the client where the user locates adds the instant message contact based on the audio and/or video information of the other user.

It is to be noted that the main body performing the individual steps of the present embodiment may be preferably any apparatus capable of realizing functions of the above steps, such as a server or the like; while who performs information interaction with the above main body may be preferably the client where the user locates, such as a mobile phone, a computer or the like. The group in the present embodiment may be presented in various ways, such as a virtual room or the like.

In the embodiment of the present disclosure, the audio and/or video information of the other user in the group requested by the user is transmitted to the user according to the user's request, so that the user may determine whether to add the other user as the instant message contact or not based on the audio and/or video information of the other user. It realizes that the user may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

Second Embodiment

Figure 2:
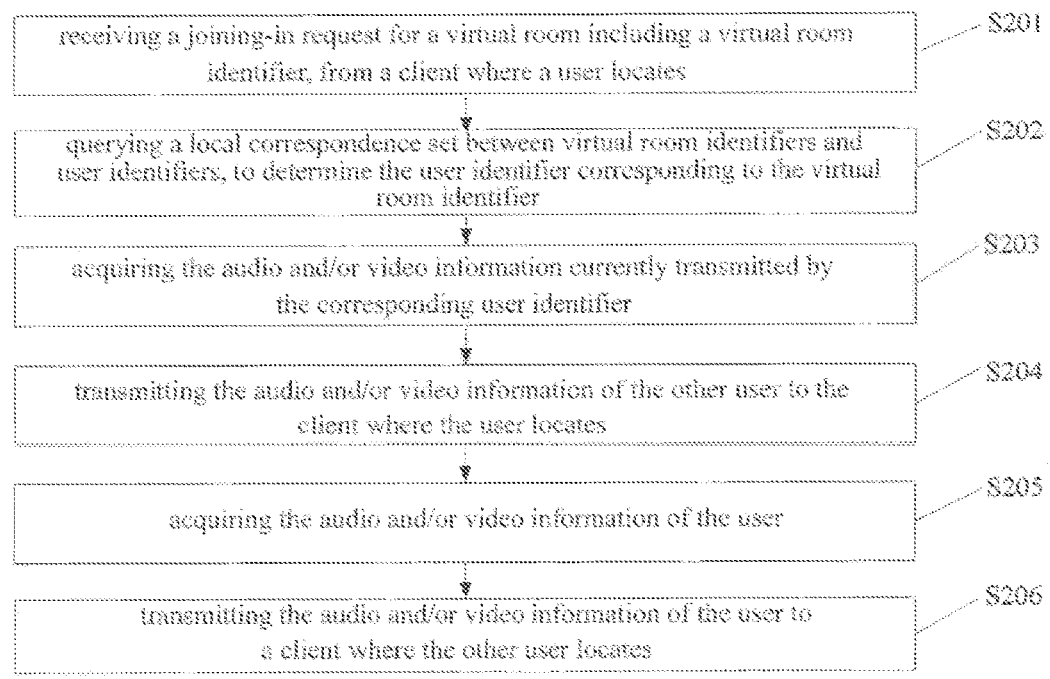
FIG. 2 is a flowchart of a method of adding an instant message contact provided in a second embodiment of the present disclosure.

A method of adding an instant message contact is provided in the embodiment of the present disclosure. Referring to FIG. 2, taking an example in which a group is a virtual room, the method of the present embodiment includes the following steps.

At Step S201, a joining-in request for a virtual room is received from a client where a user locates, the joining-in request including a virtual room identifier.

In particular, the user transmits the joining-in request for the virtual room by the client where the user locates, the joining-in request including the virtual room identifier. The users in the virtual room may communicate with each other by interaction messages. The messages may include, for example, the audio and/or video information of the user or the like. The virtual room may be provided by an instant message software operator, or alternatively may also be provided by other network platforms providing the information interaction function to users, such as a dating website, a forum or the like. The virtual room identifier may be used to indicate the virtual room which the user chooses to enter. The virtual room identifier may be a room identifier of any virtual room chosen by the user, or alternatively may be a room identifier of a virtual room recommended to the user by the system, or alternatively may be a room identifier of a virtual room where the interested user chosen by the user locates, and so on. For example, assume that the virtual room identifier included in the joining-in request in this step is F1001.

At Step S202, a local correspondence set between virtual room identifiers and user identifiers is queried, to determine the user identifier corresponding to the virtual room identifier.

In particular, the correspondence set between the virtual room identifier and the user identifier may be used to describe the users currently existing in the virtual room. The user identifier corresponding to the virtual room identifier is acquired by querying the local correspondence set between the virtual room identifiers and the user identifiers, so that the user identifiers of the users currently existing in the virtual room may be acquired.

In the correspondence set, the maximum number of user identifiers corresponding to each virtual room identifier is not limited in the present embodiment. That is, the number of users that may be accommodated in each virtual room is not limited in the present embodiment. The maximum number of user identifiers may be determined in accordance with the information exchange capability between the local side and the peer side, and the local data processing capability, and so on. Preferably, the maximum number of user identifiers is 8, that is, a maximum of 8 users may be accommodated in the same virtual room at the same time, which may be indicated by the correspondence set between the virtual room identifiers and the user identifiers as shown in Table 1. As shown by the example of Step S201, if the virtual room identifier included in the joining-in request transmitted by the user is F1001, it may be known by querying Table 1 that the user identifiers corresponding to the virtual room identifier (e.g., F1001) are U0000001, U0123234 and U1244234 currently.

TABLE 1

| virtual room identifier | user identifier |
|---|---|
| F1001 | U0000001 |
|  | U0123234 |
|  | U1244234 |
| F1002 | U2315456 |
|  | U9003028 |
| ... | ... |

At Step S203, the audio and/or video information currently transmitted by the corresponding user identifier is acquired.

In particular, the server may transmit an audio and/or video request to the client where the user locates, so that the client may initiate its audio and/or video devices, such as a microphone and/or a camera or the like, according to the request. The user is the user indicated by the corresponding user identifier. The client acquires the current audio and/or video information of the user by the audio and/or video devices, and transmits the audio and/or video information together with the corresponding user identifier to the server, so that the server acquires the audio and/or video information currently transmitted by the corresponding user identifier.

The above particular way of acquiring audio and/or video information does not limit the present disclosure thereto. Those skilled in the art may implement it in any suitable ways depending on the situation. For example, when the user intends to issue his/her audio and/or video information actively, the user may initiate his/her audio and/or video device actively, and transmit the audio and/or video information together with the user identifier to the server without any request by the server.

Optionally, the acquisition of the audio and/or video information may be adaptive according to the physical condition of the client where the user locates. For example, only the audio information is acquired when there is only the audio device at the client. In addition, the transmission mode of the audio and/or video information may be adjusted according to the current communication state between the server and the client. For example, the video information may be adjusted into modes of normal, fluent, high definition, or the like, according to the particular network transmission state.

For example, as shown in the example of Step S202, the audio and/or video information currently transmitted by the corresponding user identifier acquired in this step is the audio and/or video information currently transmitted by U0000001, U0123234 and U1244234.

At Step S204, the audio and/or video information of the other user is transmitted to the client where the user locates.

For example, the audio and/or video information of the user identifiers of U0000001, U0123234 and U1244234 is transmitted to the user, so that the user determines whether to add the other user as the instant message contact or not based on the audio and/or video information of the other user.

At Step S205, the audio and/or video information of the user is acquired.

In particular, the audio and/or video information of the user is acquired based on the user identifier of the user. For example, when the user identifier is U1234567, the audio and/or video information of the user is acquired based on the user identifier U1234567. The detailed implementation thereof may refer to Step S203.

At Step S206, the audio and/or video information of the user is transmitted to the client where the other user locates.

For example, the audio and/or video information of the user identifier of U1234567 is transmitted to users with user identifiers of U0000001, U0123234 and U1244234, respectively, so that the users with the above identifiers determine whether to add this user as the instant message contact or not based on the audio and/or video information of the user.

In the embodiment of the present disclosure, the audio and/or video information of the other user in the virtual room requested by the user is transmitted to the user according to the user's request, so that the user may determine whether to add the other user as the instant message contact or not based on the audio and/or video information of the other user. Also, the audio and/or video information of the user is transmitted to the client where the other user locates, so that the other user may determine whether to add the user as the instant message contact or not based on the audio and/or video information of the user. It realizes that the user in the virtual room may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

It is to be noted that in the second embodiment, the performance order of the steps S203-S204 and the steps S205-S206 does not follow some necessary sequence. That is, the performance order of the steps of acquiring the audio and/or video information of the other user in the virtual room and transmitting it to the client where the user locates, and the steps of acquiring the audio and/or video information of the user and transmitting it to the client where the other user in the virtual room locates does not follow some necessary sequence. Therefore, the steps S203-S204 may be performed after the steps S205-S206. Alternatively, the steps S203-S204 may be performed in parallel with the steps S205-S206. Also, the steps S203-S204 and the steps S205-S206 may be performed multiple times respectively depending on actual situations and the performance order of each time may be determined depending on the situation. Therefore, the order of respective flowchart blocks in FIG. 2 does not limit the present disclosure. Additionally, the steps S205-S206 may be applied to the first embodiment likewise.

Third Embodiment

Figure 3:
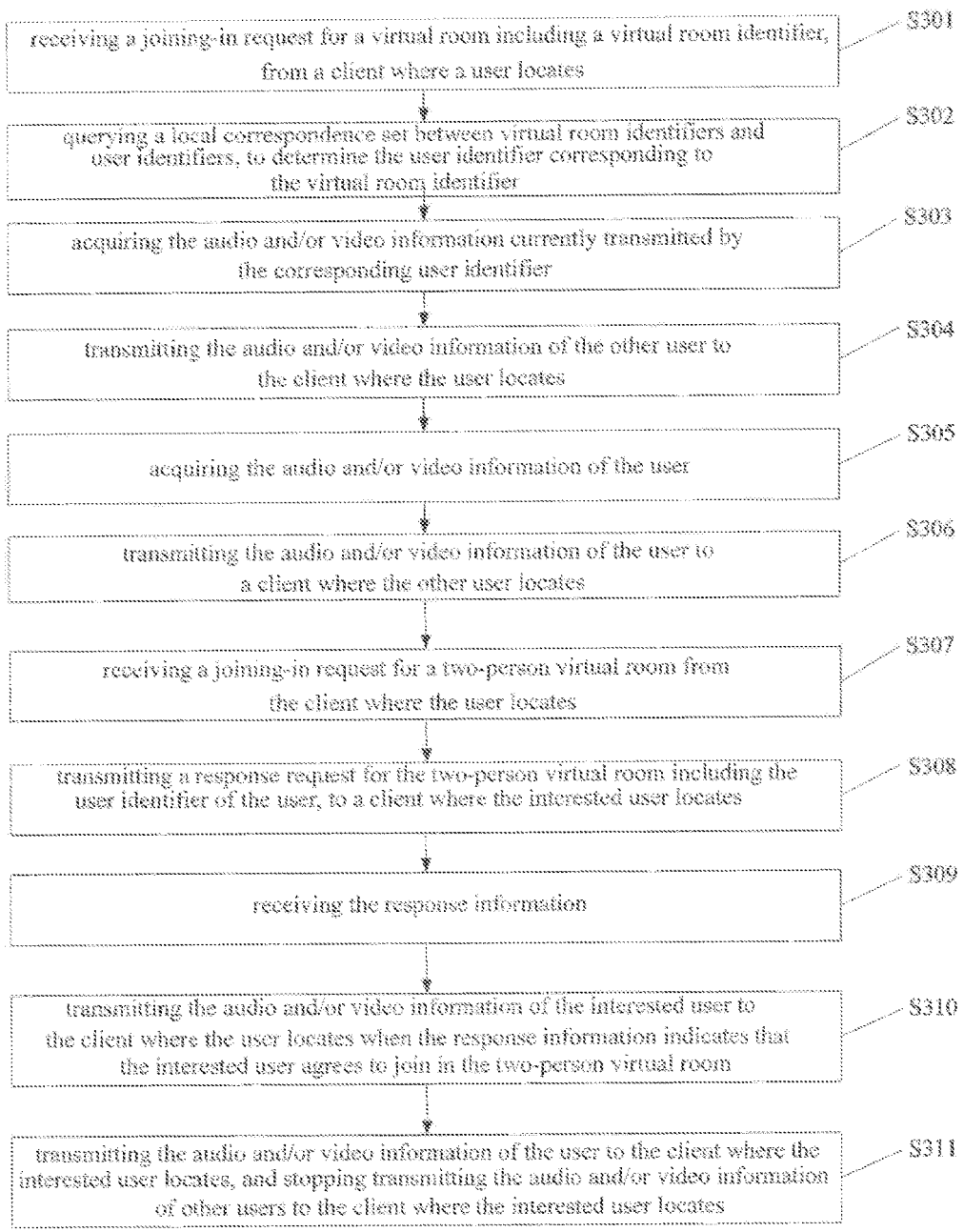
FIG. 3 is a flowchart of a method of adding an instant message contact provided in a third embodiment of the present disclosure.

A method of adding an instant message contact is provided in the embodiment of the present disclosure. Refer to FIG. 3, in which the steps of S301-S306 in the method flow are the same as the steps of S201-S206 in the second embodiment and will not be described here in detail to avoid redundancy. Different from the second embodiment, the present embodiment further includes the following steps.

At Step S307, a joining-in request for a two-person virtual room is received from the client where the user locates, the joining-in request for the two-person virtual room including an interested-user identifier, the interested user being selected from the other users by the user.

In particular, the two-person virtual room may be for example a virtual room capable of accommodating only two persons. The joining-in request is used for the user to invite the interested user to enter the two-person virtual room. The user may conduct separate communication with the chosen interested user by transmitting the joining-in request for the two-person virtual room via the client where the user locates.

For example, when the user determines the user with the user identifier of U0000001 as the interested user from the audio and/or video information of the users with the user identifiers of U0000001, U0123234 and U1244234, the received joining-in request for the two-person virtual room includes the interested user identifier U0000001.

At Step S308, a response request for the two-person virtual room including the user identifier of the user is transmitted to the client where the user corresponding to the interested user identifier locates.

In particular, the response request for the two-person virtual room may be used to request the interested user to determine whether to agree to enter the two-person virtual room so as to achieve the separate communication with the user, or not. The interested user may acquire the user information of the user based on the user identifier, so as to determine whether to agree to enter the two-person virtual room or not.

For example, the response request for the two-person virtual room may be transmitted to the client where the interested user with the user identifier of U0000001 locates. The user identifier included in the request is U1234567. Then, the interested user with the user identifier of U0000001 may acquire the user information of the user based on the user identifier of U1234567, so as to determine to agree to enter the two-person virtual room.

At Step S309, the response information is received.

At Step S310, the audio and/or video information of the interested user is transmitted to the client where the user locates and transmitting the audio and/or video information of other users than the interested user to the client where the user locates is stopped, when the response information indicates that the interested user agrees to enter the two-person virtual room.

For example, when the response information indicating that the interested user with the user identifier of U0000001 agrees to enter the two-person virtual room is received, the audio and/or video information of the interested user with the user identifier of U0000001 is transmitted only to the client where the user with the user identifier of U1234567 locates, and transmitting the audio and/or video information of the users with the user identifiers of U1244234 and U0123234 (i.e., the user identifiers other than U0000001 in Table 1) is stopped.

At Step S311, the audio and/or video information of the user is transmitted to the client where the interested user locates, and transmitting the audio and/or video information of other users to the client where the interested user locates is stopped.

In particular, the example of this step is similar to that of Step S310, and will not be described here in detail to avoid redundancy.

In the embodiment of the present disclosure, the separate communication between the user and the interested user chosen by the user in the two-person virtual room is achieved by receiving the joining-in request for inviting the interested user to enter the two-person virtual room by the user and making the interested user determine to respond to the request.

Similar to those in the second embodiment, the performance order of the steps S303-S304 and the steps S305-S306 does not follow some necessary sequence and those steps can be performed multiple times respectively, in the third embodiment. Similarly, the performance order of the step S310 and the step S311 does not follow some necessary sequence and those steps can be performed multiple times respectively. Therefore, the order of respective flowchart blocks in FIG. 3 does not limit the present disclosure. Additionally, although the steps S307-S309 are described by taking an example in which the user invites actively a certain interested user among the other users in the virtual room to enter the two-person virtual room, the present disclosure is not limited thereto. The other user in the virtual room may also choose the user as the interested user and invite the user actively to enter the two-person virtual room. Additionally, the steps S307-S311 may also be applied to the first and second embodiments likewise.

Fourth Embodiment

Figure 4:
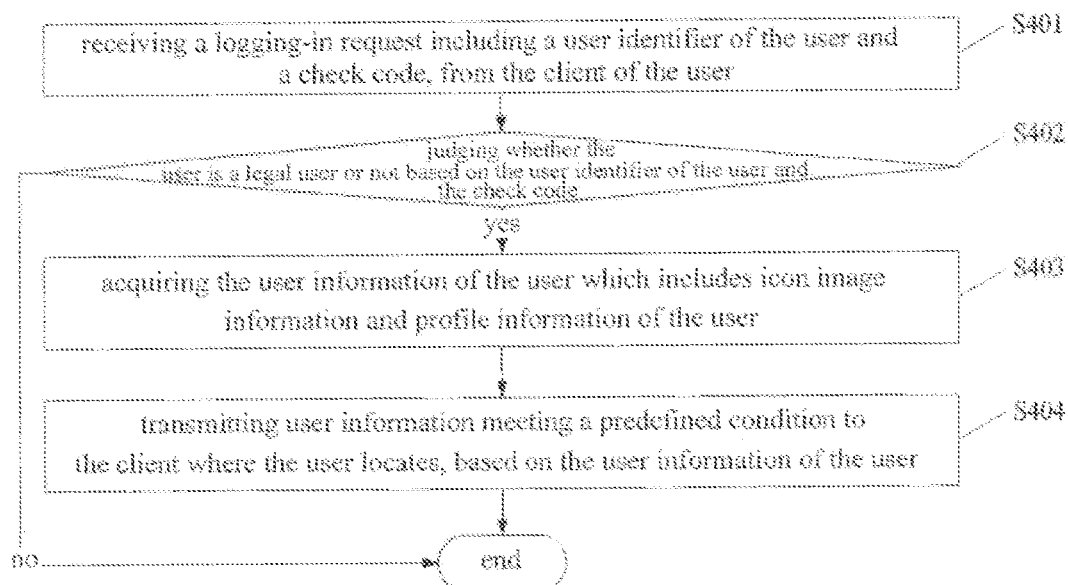
FIG. 4 is a flowchart of a method of adding an instant message contact provided in a fourth embodiment of the present disclosure.

A method of adding an instant message contact is provided in the embodiment of the present disclosure. Referring to FIG. 4, in combination with the second or the third embodiment, the method flow described in the present embodiment may further include the following steps before the first step in the second or the third embodiment.

At Step S401, a logging-in request including a user identifier of the user and a check code is received from the client of the user.

At Step S402, it is judged whether the user is a legal user or not based on the user identifier of the user and the check code, and the subsequent steps are continued to be performed when the user is the legal user.

At Step S403, user information of the user which includes icon image information and profile information of the user is acquired.

In particular, the user identifier of the user may be acquired, and the local user information set may be queried based on the user identifier. When there is the user information corresponding to the user identifier in the user information set, the corresponding user information may be acquired. When there isn't the user information corresponding to the user identifier in the user information set, a user information provision request may be transmitted to the client where the user locates, so as to make the user transmit the user information of the user thereto. The above manner of acquiring the user information of the user does not limit the present disclosure thereto. Those skilled in the art may adopt any suitable acquisition manner according to the actual requirement.

At Step S404, the user information meeting a predefined condition is transmitted to the client where the user locates based on the user information of the user.

In particular, the user information meeting the predefined condition may be transmitted to the client where the user locates for example in a way of icon wall. The user information of the icon wall is for example pushed to the user based on an algorithm matching result according to the information filled in by the user. The final presented result is for example a user matching with the user most. Here, the user information presentation manner of the icon wall does not limit the present disclosure thereto. Those skilled in the art may adopt any suitable user information presentation manner according to the actual requirement.

Preferably, the local user information set is queried based on the user information of the user. A predefined number of pieces of user information are acquired from the local user information set, in a descending order of matching degree. The acquired user information is transmitted to the client where the user locates. Further, preferably, the user state, such as offline, guest, in room or the like, of the user meeting the condition may be transmitted to the user, so that the user may determine the virtual room identifier based on the user information meeting the predefined condition.

In the embodiment of the present disclosure, the icon image information of the user and the profile information of the user are acquired. The user information meeting the predefined condition is transmitted to the client where the user locates according to the user information of the user. Thereby, the user may choose the virtual room where the interested user locates intuitionally, and then may follow the interested user to enter the virtual room where the interested user locates, to further conduct audio and/or video communication with the interested user.

Fifth Embodiment

Figure 5:
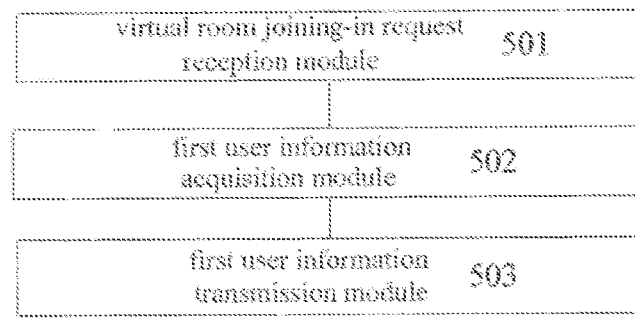
FIG. 5 is a structural schematic diagram of an apparatus of adding an instant message contact provided in a fifth embodiment of the present disclosure.

An apparatus of adding an instant message contact is provided in the embodiment of the present disclosure. Referring to FIG. 5, the apparatus may include:

a virtual room joining-in request reception module 501 which may be configured to receive a joining-in request for a virtual room from a client where a user locates, the joining-in request including a virtual room identifier;

a first user information acquisition module 502 which may be configured to acquire audio and/or video information of other user in the virtual room, based on the virtual room identifier; and a first user information transmission module 503 which may be configured to transmit the audio and/or video information of the other user to the client where the user locates, for adding by the client where the user locates the instant message contact based on the audio and/or video information of the other user.

Optionally, the group in the present disclosure may be realized in various ways, such as a virtual room.

In the embodiment of the present disclosure, the audio and/or video information of the other user in the group requested by the user is transmitted to the user according to the user's request, so that the user may determine whether to add the other user as the instant message contact or not based on the audio and/or video information of the other user. It realizes that the user may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

Sixth Embodiment

Figure 6:
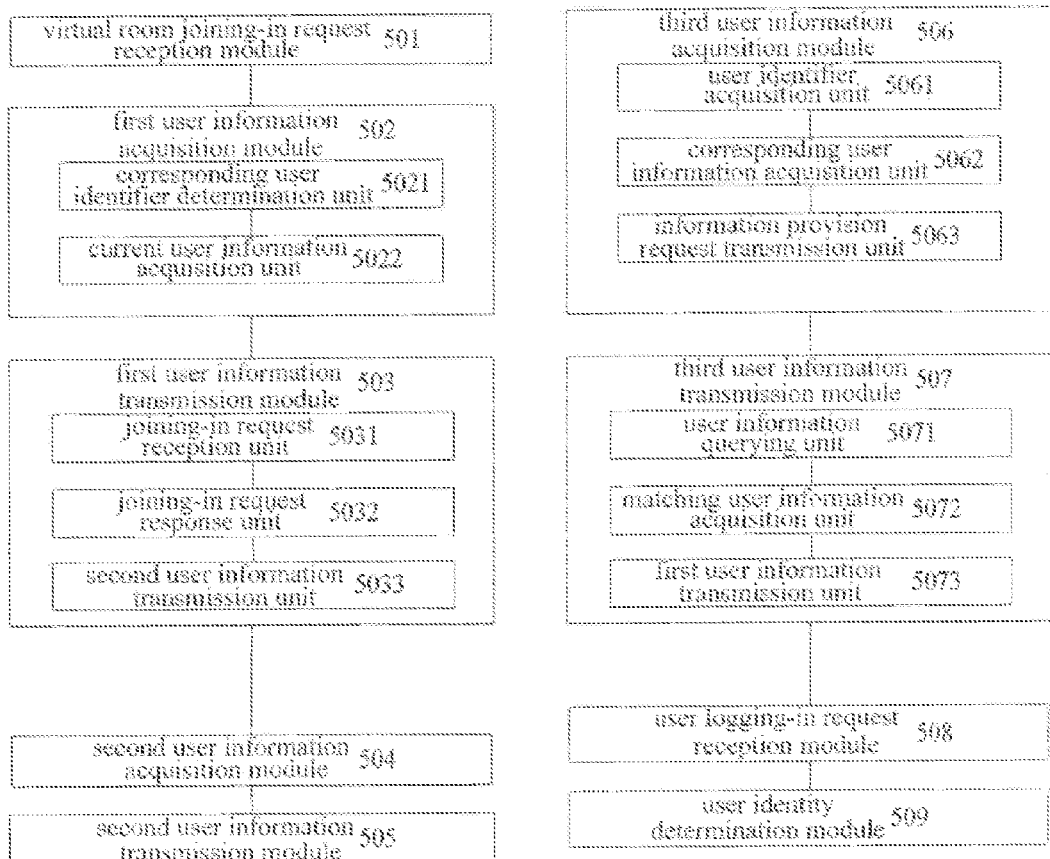
FIG. 6 is a structural schematic diagram of an apparatus of adding an instant message contact provided in a sixth embodiment of the present disclosure.

An apparatus of adding an instant message contact is provided in the embodiment of the present disclosure. The present embodiment takes an example in which the group is a virtual room. Referring to FIG. 6, the apparatus includes the virtual room joining-in request reception module 501, the first user information acquisition module 502 and the first user information transmission module 503 as in the above embodiment. Further, the apparatus in the present embodiment may further include:

a second user information acquisition module 504 which may be configured to acquire audio and/or video information of the user; and a second user information transmission module 505 which may be configured to transmit the audio and/or video information of the user to a client where the other user locates, for adding by the client where the other user locates the user as the instant message contact of the other user based on the audio and/or video information of the user.

Optionally, the apparatus may further include:

a third user information acquisition module 506 which may be configured to acquire user information of the user which includes icon image information and profile information of the user; and a third user information transmission module 507 which may be configured to transmit user information meeting a predefined condition to the client where the user locates, based on the user information of the user.

The third user information acquisition module 506 may further include:

a user identifier acquisition unit 5061 which may be configured to acquire a user identifier of the user;

a corresponding user information acquisition unit 5062 which may be configured to query a local user information set based on the user identifier, and to acquire user information corresponding to the user identifier when there is the corresponding user information in the local user information set; and an information provision request transmission unit 5063 which may be configured to transmit a user information provision request to the client where the user locates so as to make the client where the user locates transmit the user information of the user thereto, when the corresponding user information acquisition unit determines that there is no user information corresponding to the user identifier in the local user information set.

The third user information transmission module 507 may include:

a user information querying unit 5071 which may be configured to query a local user information set based on the user information of the user;

a matching user information acquisition unit 5072 which may be configured to acquire a predefined number of pieces of user information from the local user information set, in a descending order of matching degree; and a first user information transmission unit 5073 which may be configured to transmit the acquired user information to the client where the user locates.

Optionally, the apparatus may further include:

a user logging-in request reception module 508 which may be configured to receive a logging-in request including a user identifier of the user and a check code, from the client of the user; and a user identity determination module 509 which may be configured to judge whether the user is a legal user or not based on the user identifier of the user and the check code, and to continue performing the subsequent steps when the user is the legal user.

Further, the first user information acquisition module 502 may include:

a corresponding user identifier determination unit 5021 which may be configured to query a local correspondence set between virtual room identifiers and user identifiers, to determine the user identifier corresponding to the virtual room identifier; and a current user information acquisition unit 5022 which may be configured to acquire the audio and/or video information currently transmitted by the corresponding user identifier.

The first user information transmission module 503 may include:

a joining-in request reception unit 5031 which may be configured to receive a joining-in request for a two-person virtual room including an interested user identifier of an interested user, from the client where the user locates, the interested user being selected from the other users by the user;

a joining-in request response unit 5032 which may be configured to transmit a response request for the two-person virtual room including the user identifier of the user, to the client where the interested user locates, for determining by the client where the interested user locates response information for joining in the two-person virtual room based on the user identifier; and a second user information transmission unit 5033 which may be configured to receive the response information, to transmit the audio and/or video information of the interested user to the client where the user locates and to stop transmitting the audio and/or video information of other users than the interested user to the client where the user locates when the response information indicates that the interested user agrees to join in the two-person virtual room.

Correspondingly, the apparatus may further include a fourth user information transmission module which may be configured to transmit the audio and/or video information of the user to the client where the interested user locates, and to stop transmitting the audio and/or video information of other users to the client where the interested user locates.

In the embodiment of the present disclosure, the audio and/or video information of the other user in the virtual room requested by the user is transmitted to the user according to the user's request, so that the user may determine whether to add the other user as the instant message contact or not based on the audio and/or video information of the other user. Also, the audio and/or video information of the user is transmitted to the client where the other user locates, so that the other user may determine whether to add the user as the instant message contact or not based on the audio and/or video information of the user. It realizes that the user in the virtual room may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

Seventh Embodiment

Figure 7:
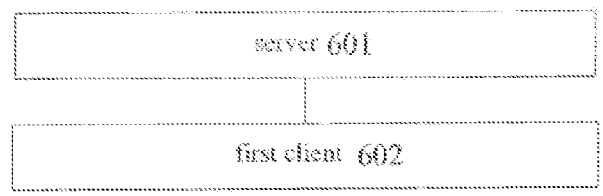
FIG. 7 is a structural schematic diagram of a system of adding an instant message contact provided in a fifth embodiment of the present disclosure.

A system of adding an instant message contact is provided in the embodiment of the present disclosure. Referring to FIG. 7, the system may include a server 601 and a first client 602.

The server 601 may be configured to receive a joining-in request for a group from the first client 602 where a user locates, the joining-in request including a group identifier; to acquire audio and/or video information of other user in the group, based on the group identifier; and to transmit the audio and/or video information of the other user to the first client 602 where the user locates.

The first client 602 may be configured to receive the audio and/or video information of the other user transmitted from the server, for adding by the first client 602 where the user locates the instant message contact based on the audio and/or video information of the other user.

In the embodiment of the present disclosure, the audio and/or video information of the other user in the group requested by the user is transmitted to the user according to the user's request, so that the user may determine whether to add the other user as the instant message contact or not based on the audio and/or video information of the other user. It realizes that the user may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

Eighth Embodiment

Figure 8:
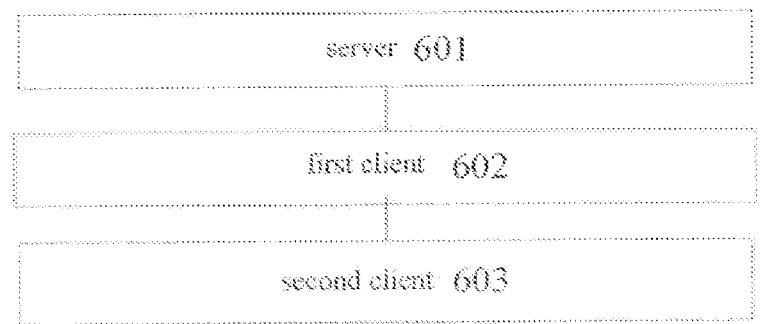
FIG. 8 is a structural schematic diagram of a system of adding an instant message contact provided in a sixth embodiment of the present disclosure.

A system of adding an instant message contact is provided in the embodiment of the present disclosure. Referring to FIG. 8, the system includes the server 601 and the first client 602 as in the above embodiment. In addition, the system in the present embodiment may further include a second client 603.

Correspondingly, the server 601 may be further configured to acquire audio and/or video information of the user; and to transmit the audio and/or video information of the user to the second client 603 where the other user locates.

The second client 603 may be configured to receive the audio and/or video information of the user transmitted from the server, for adding by the second client 603 where the other user locates the user as the instant message contact of the other user based on the audio and/or video information of the user.

In the embodiment of the present disclosure, the audio and/or video information of the other user in the group requested by the user is transmitted to the user according to the user's request, so that the user may determine whether to add the other user as the instant message contact of the user or not based on the audio and/or video information of the other user. Also, the audio and/or video information of the user is transmitted to the client where the other user locates, so that the other user may determine whether to add the user as the instant message contact or not based on the audio and/or video information of the user. It realizes that the user in the group may hear the voice and/or see the appearance of the interested user before adding the interested user as a friend. Thereby, the mutual trust between unknown users is improved, and the success ratio of adding an unknown user as a contact and the ratio of turning into a contact from an unknown user are increased.

The embodiment numbers of the present disclosures as described above are only for the purpose of description and do not represent the inferiors and superiors of embodiments.

It can be understood by those ordinary skilled in the art that all or part of steps for implementing the above embodiments may be completed by hardware or may be completed by the related hardware instructed by a program which may be stored in a computer readable storage medium which may be a read only memory, a disk, an optical disc or the like. For example, the present disclosure may be implemented as a computer readable storage medium having stored thereon a computer program containing a program code, which, when executed on a computing device, performs respective steps of the method of adding an instant message contact as described above.

Figure 9:
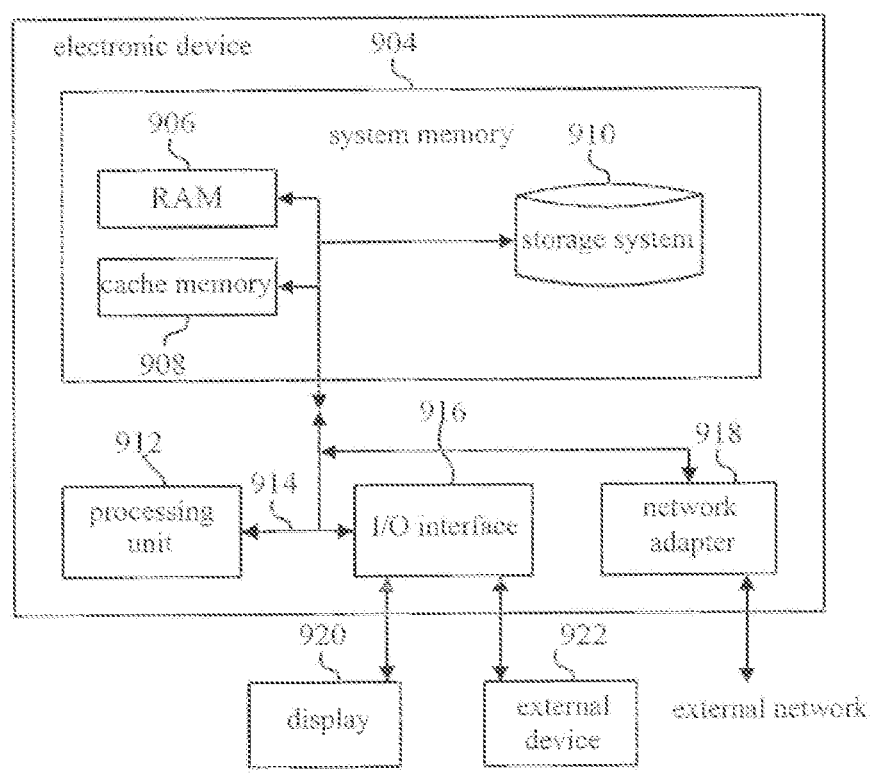
FIG. 9 is a structural schematic diagram showing an example computing device which can be used to implement respective embodiments of the present disclosure.

FIG. 9 is a structural schematic diagram showing an example computing device which can be used to implement respective embodiments of the present disclosure.

The computing device 900 shown in FIG. 9 is only an example and is not limiting of the functionality and the scope of use of embodiments of the disclosure. As shown in FIG. 9, the computing device 900 may be in a form of a general purpose computing device. Components of the computing device 900 may include, but are not limited to, one or more processors or processing units 912, a system memory 904, an I/O interface 916, a network adapter 918, a display 920 and a bus 914 that couples various components, and may be connected to an external device 922.

The bus 914 represents one or more of any of several types of bus structures. For example, such bus structures include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus and so on.

The computing device 900 typically includes a variety of computer system readable media. Such media may be any readable media that is accessible by the computing device 900, and it includes both volatile and non-volatile media, removable and non-removable media.

The system memory 904 can include readable media in the form of volatile memory, such as random access memory (RAM) 906 and/or cache memory 908. The computing device 900 may further include other removable/non-removable, volatile/non-volatile storage media. For example, the storage system 910 (typically called a "hard drive") can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 914 by one or more data media interfaces.

The system memory 904 may include at least one program product having a set (for example, at least one) of program modules which may be stored in the storage system 910. The program module contains a computer executable program instruction. Such program modules are configured to perform functions of respective embodiments of the present disclosure by the processing units 912 executing the program instruction therein. Such program modules include, but are not limited to, an operating system, one or more application programs, other program modules, and program data. Each of these examples of program modules or some combination thereof may include an implementation of a networking environment.

The computing device 900 may also communicate with one or more external devices 922 such as a keyboard, a mouse, the display 920, etc.; and one or more devices that enable a user to interact with the computing device 900. Such communication can occur via the Input/Output (I/O) interface 916. Still yet, the computing device 900 can also communicate with one or more networks such as a local area network (LAN), a general wide area network (WAN), and/or a public network (e.g., the Internet) via the network adapter 918 such as a network card, modem, etc. As shown in FIG. 9, the I/O interface 916 and the network adapter 918 communicates with the other modules of the computing device 900 via the bus 914. It should be understood that although not shown, other hardware and/or software modules could be used in conjunction with the computing device 900. Such other hardware and/or software modules include, but are not limited to: microcode, device drivers, redundant processing units, external disk drive arrays, RAID systems, tape drives, and data archival storage systems, etc.

Respective units or steps in respective embodiments of the present disclosure may all be implemented by executing program modules having computer program instructions in the computing device 900.

The described above is only preferable embodiments of the present disclosure and is not intended to limit the present disclosure. In addition, there is no preferred relationship among respective embodiments of the present disclosure, that is, the embodiments are not necessarily arranged in the order of "first embodiment", "second embodiment" and so on as given above. Any modification, equivalent replacement, improvement, etc made within the spirit and principle of the present disclosure should all be contained within the protection scope of the present disclosure.

What is claimed is:

1. A method of adding an instant message contact, comprising:
receiving a logging-in request from a client of a user, the logging-in request including a user identifier of the user and a check code;
judging whether the user is a legal user based on the user identifier of the user and the check code;
acquiring user information of the user when the user is judged to be the legal user;
causing the user for which the user information is acquired to determine a group identifier;
receiving a joining-in request for a group from the client where the user is located, the joining-in request comprising the group identifier;
causing the user to join in a group associated with the group identifier, wherein, in the group, the user and other users are capable of making instant chat by transmitting and receiving audio and/or video information as interaction messages to and from each other instantly, wherein the audio and/or video information is instantly captured during the instant chat;
acquiring audio and/or video information of another user currently transmitted in the group, based on the group identifier; and
transmitting the currently transmitted audio and/or video information of the another user to the client where the user is located, before the user adds the another user as an instant message contact, for use in determining whether the client where the user is located should add the another user as the instant message contact based on the audio and/or video information of the another user,
wherein said transmitting the currently transmitted audio and/or video information of the another user to the client where the user is located, before the user adds the another user as an instant message contact, for use in determining whether the client where the user is located should add the another user as the instant message contact based on the audio and/or video information of the another user comprises:
receiving a joining-in request for a two-person group from the client where the user is located, the joining-in request for the two-person group comprising an interested user identifier of an interested user, the interested user being selected from the other users by the user;
transmitting a response request for the two-person group comprising the user identifier of the user, to a client where the interested user is located, for determining by the client where the interested user is located response information for joining in the two-person group based on the user identifier; and
receiving the response information, transmitting the audio and/or video information of the interested user to the client where the user is located, and stopping transmitting the audio and/or video information of users other than the interested user to the client where the user is located, when the response information indicates that the interested user agrees to join in the two-person group.

2. The method according to claim 1, wherein after said acquiring audio and/or video information of another user in the group, based on the group identifier, the method further comprises:
acquiring audio and/or video information of the user; and
transmitting the audio and/or video information of the user to another client where the another user is located, for adding, by the other client where the another user is located, the user as the instant message contact of the another user based on the audio and/or video information of the user.

3. The method according to claim 1, wherein said acquiring user information of the user comprises acquiring icon image information and profile information of the user; and said causing comprises transmitting user information meeting a predefined condition, based on the user information of the user, to the client where the user is located.

4. The method according to claim 3, wherein said acquiring user information of the user comprises:
acquiring a user identifier of the user;
querying a local user information set based on the user identifier, and acquiring user information corresponding to the user identifier when there is corresponding user information in the local user information set;
transmitting a user information provision request to the client where the user is located, when there is no user information corresponding to the user identifier in the local user information set.

5. The method according to claim 3, wherein said transmitting user information meeting a predefined condition to the client where the user is located comprises:
querying a local user information set based on the user information of the user;
acquiring a predefined number of pieces of user information from the local user information set, in a descending order of matching degree; and
transmitting the acquired user information to the client where the user is located.

6. The method according to claim 1, wherein said acquiring audio and/or video information of another user in the group based on the group identifier comprises:
querying a local correspondence set between group identifiers and user identifiers, to determine which user identifier corresponds to the group identifier; and
acquiring the audio and video information currently transmitted by the corresponding user identifier.

7. The method according to claim 1, wherein after said transmitting the audio and/or video information of the interested user to the client where the user is located and stopping transmitting the audio and/or video information of other users than the interested user to the client where the user is located when the response information indicates that the interested user agrees to join in the two-person group, the method further comprises:
transmitting the audio and/or video information of the user to the client where the interested user is located, and stopping transmitting the audio and/or video information of other users to the client where the interested user is located.

8. An apparatus for adding an instant message contact, comprising:
a processor;
a memory storing therein computer executable instructions, which when executed by the processor perform:
a step of receiving a logging-in request from a client of a user, the logging-in request including a user identifier of the user and a check code;
a step of judging whether the user is a legal user based on the user identifier of the user and the check code;
a step of acquiring user information of the user when the user is judged to be the legal user;
a step of causing the user for which the user information is acquired to determine a group identifier;
a group joining-in request reception step of receiving a joining-in request for a group from the client where the user is located, the joining-in request comprising the group identifier;
a group join-in step of causing the user to join in a group associated with the group identifier, wherein, in the group, the user and other users are capable of making instant chat by transmitting and receiving audio and/or video information as interaction messages to and from each other instantly, wherein the audio and/or video information is instantly captured during the instant chat;
a first user information acquisition step of acquiring audio and/or video information of another user currently transmitted in the group, based on the group identifier; and
a first user information transmission step of transmitting the currently transmitted audio and/or video information of the another user to the client where the user is located, before the user adds the another user as an instant message contact, for use in determining whether the client where the user is located should add the another user as the instant message contact based on the audio and/or video information of the another user,
wherein said first user information transmission step comprises:
receiving a joining-in request for a two-person group from the client where the user is located, the joining-in request for the two-person group comprising an interested user identifier of an interested user, the interested user being selected from the other users by the user;
transmitting a response request for the two-person group comprising the user identifier of the user, to a client where the interested user is located, for determining by the client where the interested user is located response information for joining in the two-person group based on the user identifier; and
receiving the response information, transmitting the audio and/or video information of the interested user to the client where the user is located, and stopping transmitting the audio and/or video information of users other than the interested user to the client where the user is located, when the response information indicates that the interested user agrees to join in the two-person group.

9. The apparatus according to claim 8, wherein the computer executable instructions, when executed by the processor, further perform:
a second user information acquisition step of acquiring audio and/or video information of the user; and
a second user information transmission step of transmitting the audio and/or video information of the user to another client where the another user is located, for adding, by the other client where the another user is located, the user as the instant message contact of the another user based on the audio and/or video information of the user.

10. The apparatus according to claim 8, wherein the step of acquiring user information of the user comprises acquiring icon image information and profile information of the user; and
the first user information transmission step comprises transmitting user information meeting a predefined condition, based on the user information of the user, to the client where the user is located.

11. The apparatus according to claim 10, wherein the step of acquiring user information of the user further comprises:
a user identifier acquisition step of acquiring a user identifier of the user;
a corresponding user information acquisition step of querying a local user information set based on the user identifier, and acquiring user information corresponding to the user identifier, when there is corresponding user information in the local user information set; and an information provision request transmission step of transmitting a user information provision request to the client where the user is located, when there is no user information corresponding to the user identifier in the local user information set.

12. The apparatus according to claim 10, wherein the first user information transmission step further comprises:
a user information querying step of querying a local user information set based on the user information of the user;
a matching user information acquisition step of acquiring a predefined number of pieces of user information from the local user information set, in a descending order of matching degree; and
transmitting the acquired pieces of user information to the client where the user is located.

13. The apparatus according to claim 8, wherein the first user information acquisition step comprises:
a corresponding user identifier determination step of querying a local correspondence set between group identifiers and user identifiers, to determine the user identifier corresponding to the group identifier; and
a current user information acquisition step of acquiring the audio and/or video information currently transmitted by the corresponding user identifier.

14. The apparatus according to claim 8, wherein the computer executable instructions, when executed by the processor, further perform:
a fourth user information transmission step of transmitting the audio and/or video information of the user to the client where the interested user is located, and stopping transmitting the audio and/or video information of other users to the client where the interested user is located.

15. A system of adding an instant message contact, comprising:
a server and
a first client,
wherein the server is configured to receive a logging-in request from a client of a user, the logging-in request including a user identifier of the user and a check code; judge whether the user is a legal user based on the user identifier of the user and the check code; acquire user information of the user when it is judged that the user is the legal user; cause the user for which user information is acquired to determine a group identifier; receive a joining-in request for a group from the first client where a user is located, the joining-in request comprising the group identifier; cause the user to join in a group associated with the group identifier, wherein, in the group, the user and other users are capable of making instant chat by transmitting and receiving audio and/or video information to and from each other instantly, wherein the audio and/or video information is instantly captured during the instant chat; acquire audio and/or video information of another user currently transmitted in the group based on the group identifier; and transmit the currently transmitted audio and/or video information of the another user to the first client where the user is located before the user adds the another user as an instant message contact;
wherein the first client is configured to receive the audio and/or video information of the another user transmitted from the server, for use in determining whether the first client where the user is located should add the another user as the instant message contact based on the audio and/or video information of the another user, and wherein the server is configured to:
receive a joining-in request for a two-person group from the client where the user is located, the joining-in request for the two-person group comprising an interested user identifier of an interested user, the interested user being selected from the other users by the user;
transmit a response request for the two-person group comprising the user identifier of the user, to a client where the interested user is located, for determining by the client where the interested user is located response information for joining in the two-person group based on the user identifier; and
receive the response information, transmit the audio and/or video information of the interested user to the client where the user is located, and stop transmitting the audio and/or video information of users other than the interested user to the client where the user is located, when the response information indicates that the interested user agrees to join in the two-person group.

16. The system according to claim 15, further comprising a second client, wherein
the server is further configured to acquire audio and/or video information of the user, and to transmit the audio and/or video information of the user to the second client where the another user is located; and
the second client is configured to receive the audio and/or video information of the user transmitted from the server, for use in determining whether the second client where the another user is located should add the user as the instant message contact of the another user based on the audio and/or video information of the user.

17. A non-transitory computer readable storage medium having stored thereon a computer program containing program codes, which, when executed on a computing device, perform a method of adding an instant message contact, the method comprising:
receiving a logging-in request from a client of a user, the logging-in request including a user identifier of the user and a check code;
judging whether the user is a legal user based on the user identifier of the user and the check code;
acquiring user information of the user when the user is the legal user;
causing the user for which user information is acquired to determine a group identifier;
receiving a joining-in request for a group from the client where the user is located, the joining-in request comprising a group identifier;
causing the user to join in a group associated with the group identifier, wherein, in the group, the user and other users are capable of making instant chat by transmitting and receiving audio and/or video information to and from each other instantly, wherein the audio and/or video information is instantly captured during the instant chat;
acquiring audio and/or video information of another user currently transmitted in the group, based on the group identifier; and
transmitting the currently transmitted audio and/or video information of the another user to the client where the user is located, before the user adds the another user as an instant message contact, for use in determining whether the client where the user is located should add the another user as the instant message contact based on the audio and/or video information of the another user,
wherein said transmitting the currently transmitted audio and/or video information of the another user to the client where the user is located, before the user adds the another user as an instant message contact, for use in determining whether the client where the user is located should add the another user as the instant message contact based on the audio and/or video information of the another user comprises:

receiving a joining-in request for a two-person group from the client where the user is located, the joining-in request for the two-person group comprising an interested user identifier of an interested user, the interested user being selected from the other users by the user;

transmitting a response request for the two-person group comprising the user identifier of the user, to a client where the interested user is located, for determining by the client where the interested user is located response information for joining in the two-person group based on the user identifier; and receiving the response information, transmitting the audio and/or video information of the interested user to the client where the user is located, and stopping transmitting the audio and/or video information of users other than the interested user to the client where the user is located, when the response information indicates that the interested user agrees to join in the two-person group.

* * * * *